(12) United States Patent
Wagner et al.

(10) Patent No.: US 10,914,352 B2
(45) Date of Patent: Feb. 9, 2021

(54) DISC BRAKE ASSEMBLY FOR REDUCING BRAKE DISC CORROSION

(71) Applicant: VOLKSWAGEN AKTIENGESELLSCHAFT, Wolfsburg (DE)

(72) Inventors: Tobias Wagner, Wolfsburg (DE); Ulf Sintram, Salzgitter (DE)

(73) Assignee: Volkswagen Aktiengesellschaft

( * ) Notice: Subject to any disclaimer, the term of this patent is extended or adjusted under 35 U.S.C. 154(b) by 51 days.

(21) Appl. No.: 16/273,657

(22) Filed: Feb. 12, 2019

(65) Prior Publication Data
US 2019/0249730 A1 Aug. 15, 2019

(30) Foreign Application Priority Data

Feb. 12, 2018 (DE) .......................... 10 2018 202 094

(51) Int. Cl.
| | |
|---|---|
| *F16D 65/00* | (2006.01) |
| *F16D 65/12* | (2006.01) |
| *F16D 55/22* | (2006.01) |
| *B60T 1/06* | (2006.01) |
| *F16D 65/092* | (2006.01) |
| *C23F 13/10* | (2006.01) |
| *B60T 7/18* | (2006.01) |

(52) U.S. Cl.
CPC ............ *F16D 65/0025* (2013.01); *B60T 1/06* (2013.01); *F16D 55/22* (2013.01); *F16D 65/122* (2013.01); *B60T 7/18* (2013.01); *C23F 13/10* (2013.01); *F16D 65/092* (2013.01); *F16D 65/12* (2013.01)

(58) Field of Classification Search
CPC .... F16D 65/0025; F16D 55/22; F16D 65/122; F16D 65/092; F16D 65/12; B60T 1/06; B60T 7/18

See application file for complete search history.

(56) References Cited

U.S. PATENT DOCUMENTS 5,099,962 A * 3/1992 Furusu ................ F16D 65/0006
188/251 A
6,142,263 A * 11/2000 Lotfipour .............. F16D 65/092
188/73.37

FOREIGN PATENT DOCUMENTS

| DE | 2933488 A1 | 4/1981 | |
| DE | 102006043277 A1 | 4/2007 | |
| DE | 602004013055 T2 | 5/2009 | |
| GB | 2173267 A * | 10/1986 | ......... F16D 65/0037 |
| JP | 2015072023 A | 4/2015 | |

(Continued)

OTHER PUBLICATIONS

Search Report for German Patent Application No. 10 2018 202 094.9; dated Dec. 19, 2018.

*Primary Examiner* — Melanie Torres Williams
(74) *Attorney, Agent, or Firm* — Barnes & Thornburg LLP

(57) ABSTRACT

A disc brake assembly for a wheel of a transportation vehicle having a brake disc and a brake caliper support for holding a brake caliper with friction brake pads. To reliably reduce corrosion of the brake disc, a bimetallic plate is provided on the disc brake assembly, wherein a sacrificial anode is secured on the bimetallic plate. The bimetallic plate adopts at least two positions, depending on the temperature of the bimetallic plate. In the first position, the sacrificial anode rests at least partially against the brake disc and, in the second position, the sacrificial anode is at a distance from the brake disc.

18 Claims, 5 Drawing Sheets

(56) References Cited

FOREIGN PATENT DOCUMENTS

WO        20013132104 A1    9/2013
WO    WO-2013132104 A1 *  9/2013  .......... F16D 69/025

* cited by examiner

DISC BRAKE ASSEMBLY FOR REDUCING BRAKE DISC CORROSION

PRIORITY CLAIM

This patent application claims priority to German Patent Application No. 10 2018 202 094.9, filed 12 Feb. 2018, the disclosure of which is incorporated herein by reference in its entirety.

SUMMARY

Illustrative embodiments relate to a disc brake assembly for a wheel of a transportation vehicle.

BRIEF DESCRIPTION OF THE DRAWINGS

In the drawings which follow and the associated descriptions, the disclosed embodiments are described, wherein identical reference signs relate to functionally identical or similar components. In the drawings

DETAILED DESCRIPTION

Figure 1:
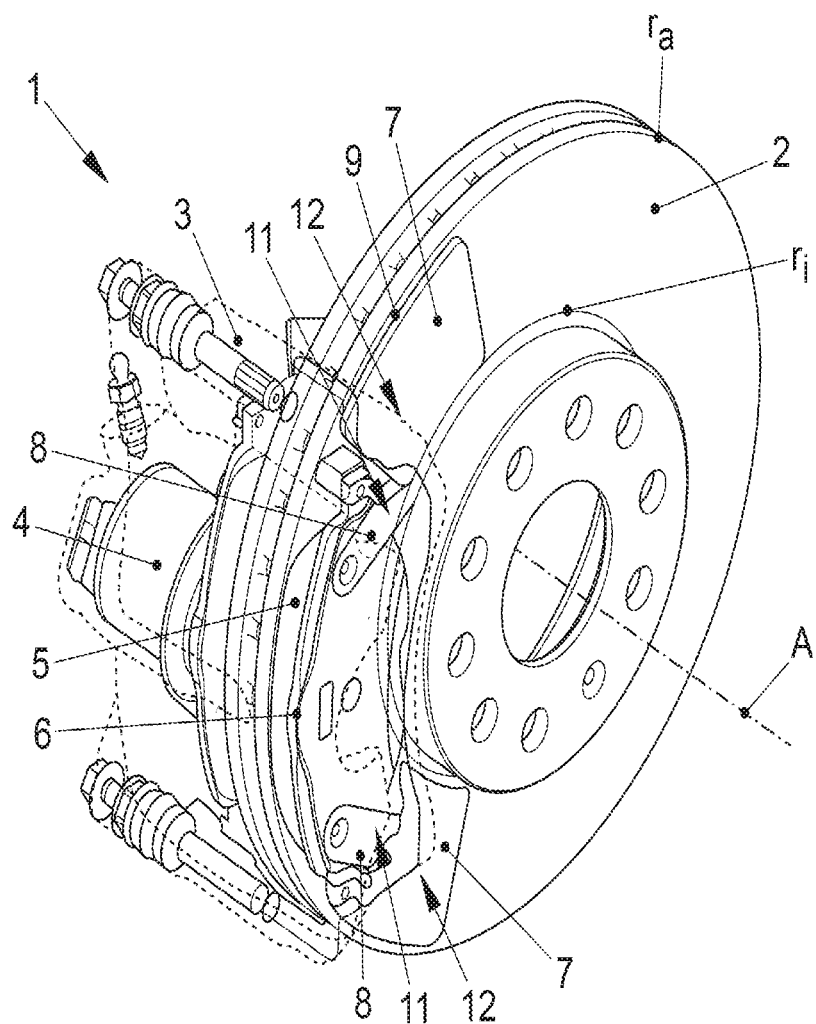
FIG. 1 shows an illustrative embodiment of a disc brake assembly having bimetallic plates and sacrificial anodes on the side of the brake disc facing away from the brake caliper.

Disc brakes are one of the most frequently used types of brake in transportation vehicles. Disc brakes comprise a brake disc, which co-rotates on the wheel shaft, and brake pads, which are pressed against the brake disc on both sides during the braking process. Brake discs consist largely of gray cast iron, which can corrode due to contact with water and air. Owing to the increased use of energy recovery in transportation vehicles, a large proportion of all braking processes is no longer carried out by the friction brake. As a result, existing areas of corrosion on the brake disc are subject to less mechanical abrasion and thus remain on the brake disc.

Brake discs made of alternative materials or with alternative coatings, such as hard metal or stainless steel, are generally more expensive, are often not yet technically mature and, particularly in the case of stainless steel brake discs, have the potential for severe distortion of the brake disc due to thermal loads.

There is a known practice of using "sacrificial anodes" for the more frequently used and less expensive gray cast iron brake discs, these being intended to act on the brake discs in such a way as to at least reduce corrosion. For sacrificial anodes, use is made of less noble materials, which are intentionally brought into electrically conductive contact with nobler materials in this way to reduce the corrosion of the nobler material. The terms "nobler" and "less noble" refer to the different redox potentials of the two materials. Typical sacrificial anode materials for gray cast iron brake discs contain zinc, sodium, magnesium and/or the alloys thereof.

WO 2013 132 104 A1 relates to a friction brake pad of a disc brake into which a sacrificial anode material is incorporated. During braking, this sacrificial anode material is mechanically abraded and applied to the brake disc as an anti-corrosion layer. The sacrificial anode material can be incorporated into the friction brake pad as a strip across the entire width of the friction brake pad or over the entire surface as cylindrical elements.

DE 10 2006 043 277 A1 discloses a brake pad and a brake disc in which sacrificial anode material is incorporated by inclusions or embedded elements to protect against corrosion.

DE 29 33 488 A1 relates to a disc brake assembly having at least one recess in a brake disc and/or in a friction brake pad. In this recess there is sacrificial anode material to avoid corrosion of the brake disc.

The prior art presented does not take account of the fact that the melting temperatures of typical sacrificial anode materials are generally lower than the temperatures which the brake disc may reach. As a result, the sacrificial anode material may melt during normal operation, and a layer which impairs the braking action and may lead to irreversible damage to the brake disc may form on the friction surface. The materials as presented in the prior art can therefore be used only to a limited extent in practice.

Moreover, it is likewise detrimental that the sacrificial anode materials employed only have an extensive corrosion-reducing effect on the disc brake if braking involves friction of the friction brake pad on the brake disc. During energy recovery, there is no abrasion and no mechanical distribution of the sacrificial anode material on the brake disc, and the corrosion-reducing effect of the sacrificial anode material is significantly restricted.

Starting from the prior art described above, the disclosed embodiments provide a disc brake assembly which reliably reduces the corrosion of the brake disc.

This is achieved by the disclosed brake assembly.

Disclosed embodiments provide a disc brake assembly for a wheel of a transportation vehicle, which comprises a brake disc and a brake caliper support for holding a brake caliper with friction brake pads. A bimetallic plate, on which a sacrificial anode is secured, is provided on the disc brake assembly. The bimetallic plate can adopt at least two positions, depending on the temperature of the bimetallic plate. In the first position, the sacrificial anode rests at least partially against the brake disc and, in the second position, the sacrificial anode is at a distance from the brake disc.

In the first position, the sacrificial anode can have a corrosion-reducing effect on the brake disc, even in the absence of the conventional braking process. Owing to the rotation of the brake disc and the resulting friction of the sacrificial anode on the brake disc, there is mechanical abrasion of the sacrificial anode. Particles from the sacrificial anode are distributed on the brake disc and reduce brake disc corrosion.

The geometrical shape of the bimetallic plate changes in accordance with the temperature thereof. Owing to the change in the geometrical shape of the bimetallic plate, the sacrificial anode loses contact with the brake disc, protecting the sacrificial anode from the high temperatures of the brake disc which can occur during operation.

The temperature of the bimetallic plate changes when the brake disc heats up during operation and radiates heat into the environment or transfers heat to the bimetallic plate via the heat-conducting components of the brake disc assembly. The melting temperature of the bimetallic plate is beneficial above the maximum operating temperature of the brake disc which occurs.

The bimetallic plate described is a component composed of a bimetal with a depth which is significantly smaller than its length and width. By virtue of this flat geometry, the bimetal including the sacrificial anode can be installed without major modifications in any disc brake assembly. In relation to its longitudinal axis, the bimetallic plate has two ends, which are referred to as the fixed end and the free end. The fixed end is the part of the bimetallic plate by which the bimetallic plate is fixed on the disc brake assembly. The free end is the part of the bimetallic plate which moves to the greatest extent relative to the disc brake assembly under the influence of temperature.

The shape of the sacrificial anode can be matched to the shape of the bimetallic plate. It is conceivable that the sacrificial anode projects beyond the bimetallic plate in this way to cover a larger contact area on the brake disc.

It is beneficial if the sacrificial anode rests partially at least against the friction surface of the brake disc in the first position. The friction surface is taken to mean the area on the brake disc which comes into direct contact with the brake pad. As a result of the contact between the sacrificial anode and the friction surface, the sacrificial anode particles are distributed on the friction surface and reduce corrosion there.

It may be beneficial if the bimetallic plate is fixed by the fixed end on a backing plate of the friction brake pad. In this disclosed embodiment, the bimetallic plate is fixed on the components of the disc brake assembly which are usually already present. This disclosed embodiment is beneficial because the bimetallic plate can be changed together with the sacrificial anode and the friction brake pad.

In another disclosed embodiment, the bimetallic plate is fixed by a fixed end on the brake caliper support. Here too, a benefit is drawn from securing the bimetallic plate on components of the disc brake assembly which are usually already present, and no further components are necessary for fixing. Securing it on the brake caliper support is recommended since the sacrificial anode and/or the bimetallic plate are easily accessible and are therefore easy to exchange.

The bimetallic plate can be fixed directly or via a holding element on the backing plate or on the brake caliper support. The bimetallic plate can likewise also be embodied in such a way that a holding element for fixing is integrated on the fixed end. In this case, it is possible for parts of the bimetallic plate to be shaped to form this holding element.

Another disclosed embodiment envisages that the bimetallic plate or the holding element is fixed by riveting, welding or screw fastening. The benefit of these types of fixing is the thermal stability at the high operating temperatures of disc brake assemblies.

In another disclosed embodiment, the sacrificial anode is secured on the bimetallic plate by adhesive bonding, clipping, welding or brazing. This is beneficial since such types of securing are thermally stable at the temperatures which a disc brake assembly can reach.

Securing the sacrificial anode on the free end of the bimetallic plate allows the free end of the bimetallic plate to undergo the greatest deflection when heated. Thus, the sacrificial anode is at the greatest possible distance from the hot brake disc when at the free end of the bimetallic plate.

It is beneficial if the bimetallic plate is in the first position when the temperature of the sacrificial anode is lower than the melting temperature of the sacrificial anode material. This beneficially enables the sacrificial anode to exert a corrosion-reducing effect on the brake disc until the bimetallic plate has heated up to such an extent during operation that the second position is adopted. In this position, the temperature of the sacrificial anode can be approximately equal to or greater than the melting temperature of the sacrificial anode material. This has the benefit that the sacrificial anode is not in contact with the brake disc when the melting temperature is exceeded. Thus, it is not possible for the sacrificial anode material to melt when the brake disc is hot. To achieve the two positions, it is necessary to make an appropriate choice both of bimetallic plate as regards material composition, location of securing and/or geometry and of sacrificial anode as regards the geometry and/or location of securing of the anode on the bimetallic plate.

It may be beneficial if there is a thermally insulating material between the bimetallic plate and the sacrificial anode. A low degree of heat exchange between the bimetallic plate and the sacrificial anode ensures that heating of the sacrificial anode by the bimetallic plate is negligible.

In at least one disclosed embodiment, the bimetallic plate with the sacrificial anode is installed on the remainder of the disc brake assembly in such a way that it is in contact with the brake disc only during a braking process, i.e., when the friction brake pad is pressed against the brake disc. As a result, it is only during braking processes that sacrificial anode particles are applied to the brake disc, and the wearing of the sacrificial anode is lower in comparison with continuous mechanical abrasion.

In another disclosed embodiment, the contact area of the sacrificial anode on the brake disc extends radially over the friction surface, optionally over the brake disc. That is to say that the contact area extends from the inner edge of the friction surface or of the brake disc to the outer edge. During the rotation of the brake disc and the mechanical abrasion of the sacrificial anode against the brake disc or against the friction surface of the brake disc, the corrosion-reducing particles are beneficially distributed over the entire surface.

In another disclosed embodiment, the bimetallic plate and/or the sacrificial anode are/is curved along the axis of rotation of the brake disc. The bimetallic plate and/or the sacrificial anode match the round shape of the brake disc. As a result, the bimetallic plate can adopt a shape which is as long as possible without projecting beyond the brake disc. The longer shape of the bimetallic plate allows larger deflections of the free end.

It is likewise beneficial if not just one but several bimetallic plates with sacrificial anodes are provided on the disc brake assembly and can be in contact with the brake disc. On the one hand, a larger area on which the particles of the sacrificial anode are distributed by abrasion is covered on the brake disc. On the other hand, failure or malfunctioning of one bimetallic plate is at least partially compensated by the other bimetallic plate. The sacrificial anode material and the shape of the sacrificial anodes can likewise differ, as can the materials of which the bimetallic plates consist. The shape of the various bimetallic plates does not have to be identical.

FIG. 1 shows a disc brake assembly 1 of a transportation vehicle wheel having bimetallic plates 7 and sacrificial anodes 9 on the side facing away from the brake caliper. The disc brake assembly 1 comprises a brake disc 2, a brake caliper support 3 and a brake caliper 4. The brake caliper 4 serves to hold friction brake pads 5. Each friction brake pad 5 is secured on a brake caliper 4 by a backing plate 6. FIG. 1 shows the disc brake assembly 1 during a braking process, in which the friction brake pads 5 are pressed against the brake disc 2.

The two bimetallic plates 7 are fixed on the backing plate 6 facing away from the brake caliper. Both bimetallic plates 7 have integrated holding elements 8 at the fixed ends 11. These holding elements are fixed on the backing plate 6 by riveting. The bimetallic plates 7 are curved along the axis of rotation A. This means that the bimetallic plates extend longitudinally at a fixed radius around the axis of rotation A. The sacrificial anodes 9 are secured at the free ends 12 on the bimetallic plates 7 by adhesive bonding. In the illustration according to FIG. 1, the sacrificial anodes 9 rest against the brake disc 2, and therefore the bimetallic plates 7 are in a first position. In this position, the temperature of the sacrificial anodes 9 is below the melting temperature of the sacrificial anode material. The contact area of the sacrificial anodes 9 on the brake disc 2 extends radially over the friction surface of the brake disc 2. That is to say that the sacrificial anodes 2 extend from an inner edge $r_i$ to an outer edge $r_a$ of the friction surface. Owing to the friction of the sacrificial anodes 9 on the brake disc 2, small particles of the sacrificial anodes 9 get onto the friction surface of the brake disc 2, thereby reducing the corrosion of the brake disc 9.

Figure 2:
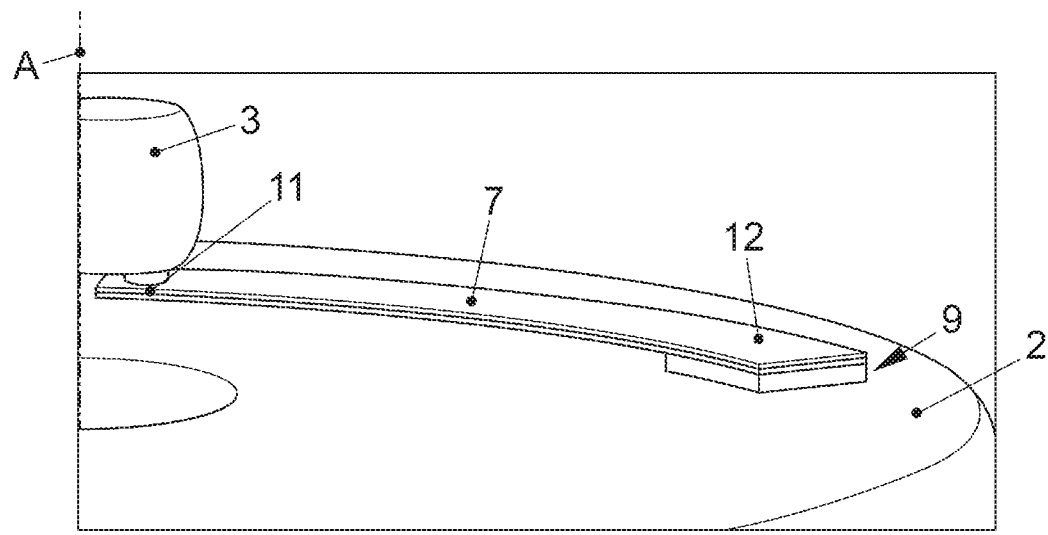
FIG. 2 shows a detail of another illustrative embodiment of a disc brake assembly having a bimetallic plate and a sacrificial anode in the first position.

FIG. 2 shows a detail of another illustrative embodiment of a disc brake assembly 1. Among the components of the disc brake assembly 1 are a brake disc 2 and a brake caliper support 3. In this illustrative embodiment, a bimetallic plate 7 is screwed to the brake caliper support 3 at the fixed end 11. The bimetallic plate 7 is curved along the axis of rotation A. A sacrificial anode 9 is secured on the free end 12 of the bimetallic plate 7 by brazing. The bimetallic plate 7 is in a first position, as a result of which the sacrificial anode 9 rubs against the brake disc 2 during rotation of the latter. In this position, the temperature of the sacrificial anode 9 is below the melting temperature of the sacrificial anode material. As a result of the rubbing of the sacrificial anode 9 on the brake disc 2, sacrificial anode particles are distributed on the brake disc and thus reduce corrosion.

Figure 3:
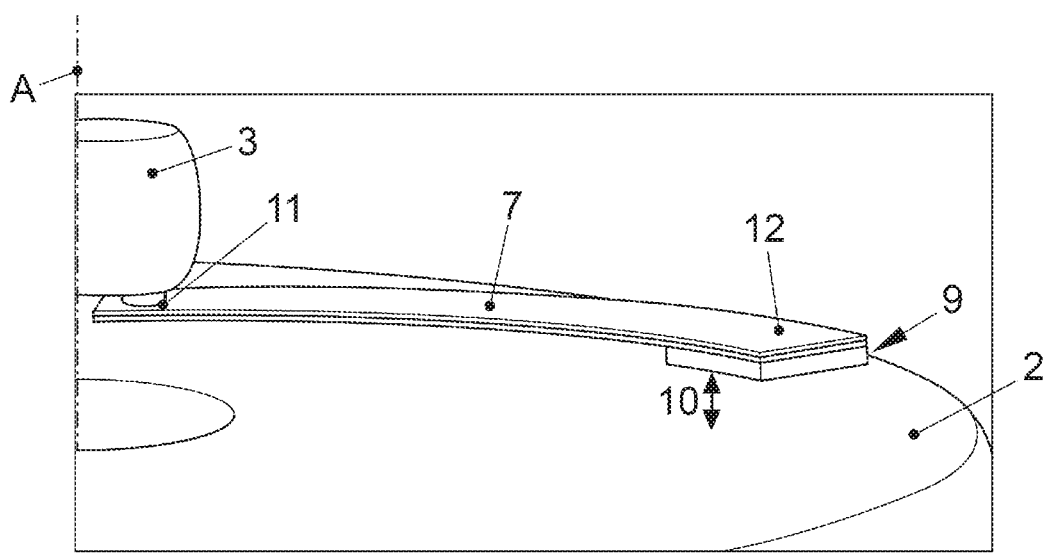
FIG. 3 shows the illustrative embodiment from FIG. 2 with the bimetallic plate in the second position.

FIG. 3 shows the illustrative embodiment from FIG. 2 but here the bimetallic plate 7 is in a second position. In this position, the bimetallic plate 7 has been geometrically deformed by the effect of temperature in such a way that a distance 10 forms between the sacrificial anode 9 at the free end 12 at the bimetallic plate 7 and the brake disc 2. This distance 10 is intended to protect the sacrificial anode 9 from the hot temperatures which the brake disc 2 can reach during normal operation.

Figure 4:
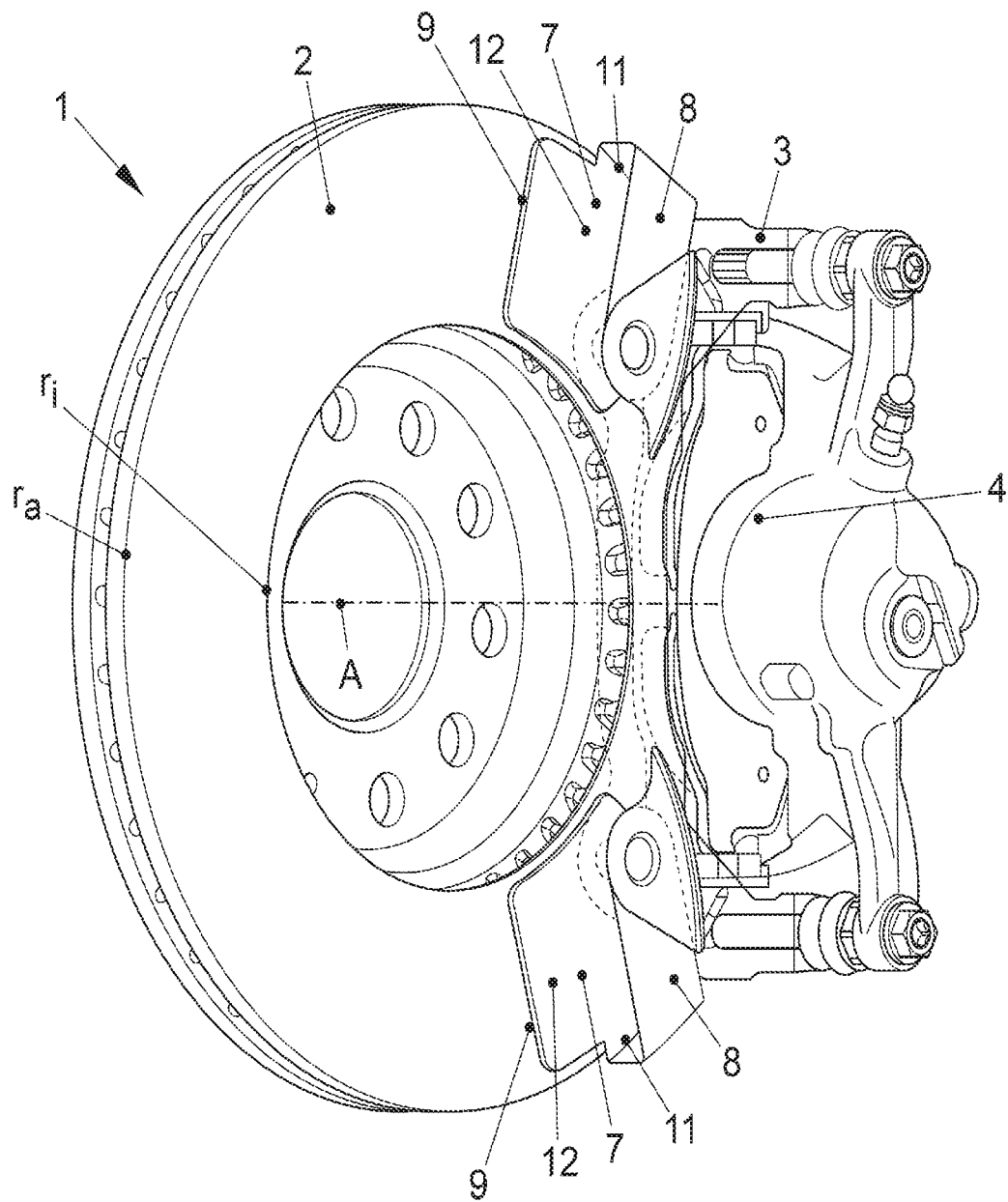
FIG. 4 shows another illustrative embodiment of a disc brake assembly having bimetallic plates and sacrificial anodes on the side of the brake disc facing the brake caliper.

FIG. 4 illustrates a disc brake assembly 1 of a transportation vehicle wheel having bimetallic plates 7 and sacrificial anodes 9 on the side facing the brake caliper, during a braking process. The disc brake assembly 1 comprises a brake disc 2, a brake caliper support 3 and a brake caliper 4. In this illustrative embodiment, the fixed ends 11 of the bimetallic plates 7 are screwed to the brake caliper support 3 at the pivot bearing by integrated holding elements 8. In the illustration according to FIG. 4, the bimetallic plates are in a first position, and therefore the sacrificial anodes 9 are in contact with the brake disc 2. Owing to the rotation of the brake disc 2, the particles of the sacrificial anodes 9 are abraded and settle on the brake disc 2, where they can have a corrosion-reducing effect. The contact area of the respective sacrificial anodes 9 with the brake disc extends radially outwards over the friction surface of the brake disc 2.

Figure 5:
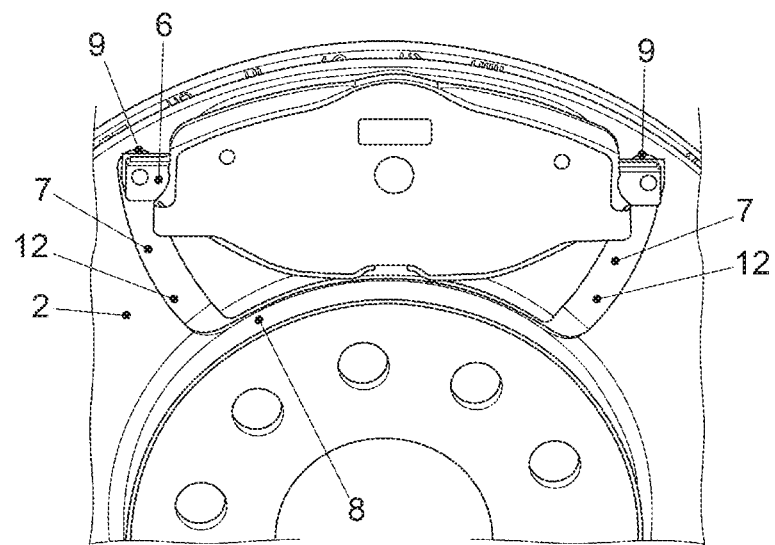
FIG. 5 shows a detail of another illustrative embodiment of a disc brake assembly having bimetallic plates and sacrificial anodes on the side of the brake disc facing away from the brake caliper.
Figure 6:
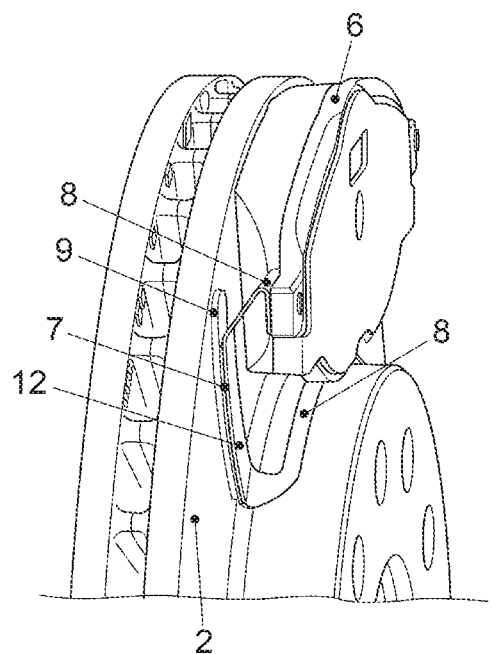
FIG. 6 shows a side view of the illustrative embodiment from FIG. 3.

FIG. 5 and FIG. 6 illustrate detail views of a disc brake assembly 1 of a transportation vehicle having bimetallic plates 7 and sacrificial anodes 9 on the side facing away from the brake caliper of the disc brake. In this disclosed embodiment, an arrangement comprising two bimetallic plates 7 is fixed by riveting on the backing plate of the brake pad 6 via integrated holding elements 8. Another holding element 8 is seated on the free ends 12 of the bimetallic plates 7 and stabilizes them with respect to shocks which may occur during driving. All the holding elements 8 are sufficiently flexible to allow bending of the bimetallic plates 7. Both the bimetallic plates 7 and the sacrificial anodes 9 have an elongate, strip-shaped geometry. The sacrificial anodes 9 project beyond the bimetallic plates 7 in this way to cover the entire friction surface. The sacrificial anodes 9 are adhesively bonded to the bimetallic plates 7. The bimetallic plates 7 are in a first position. In this position, the sacrificial anodes 9 are in contact with the brake disc 2, enabling them to exert a corrosion-reducing effect.

Figure 7:
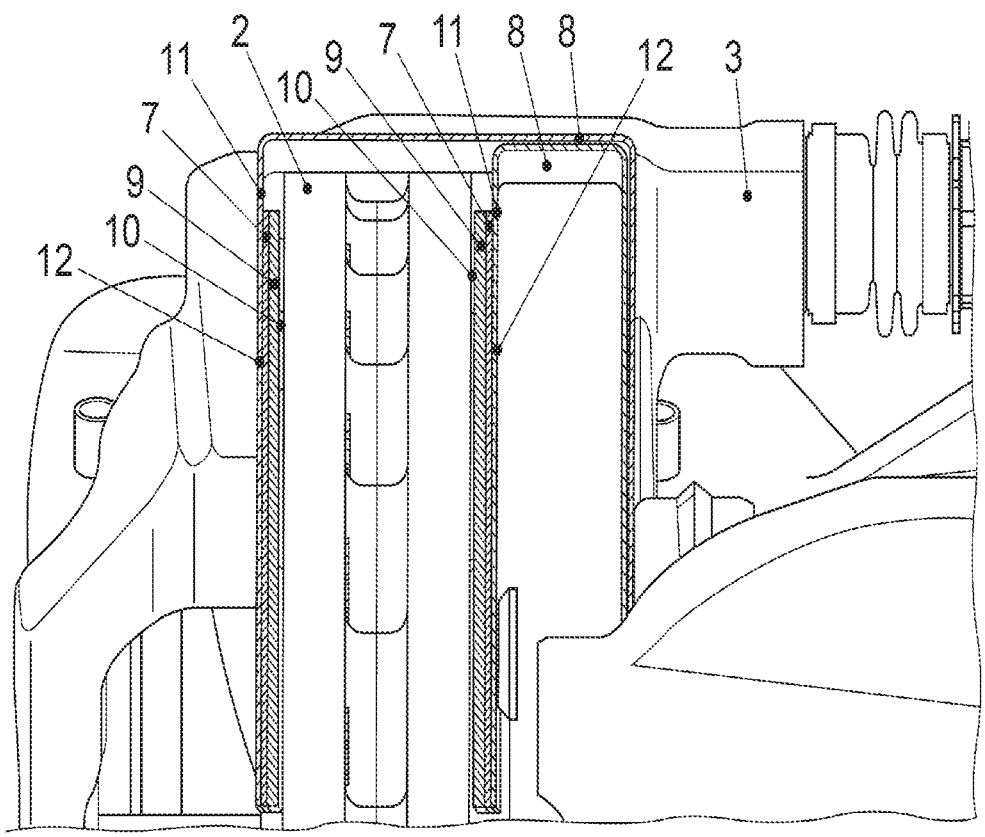
FIG. 7 shows a side view of another illustrative embodiment of a disc brake assembly having bimetallic plates and sacrificial anodes on both sides, in the second position.

FIG. 7 shows a detail view from the side of a disc brake assembly 1 of a transportation vehicle wheel with bimetallic plates 7 and sacrificial anodes 9 on both sides. In the detail view, a brake disc 2 and a brake caliper support 3 can be seen. In this illustrative embodiment, the two bimetallic plates 7 are fixed on the brake caliper support 3 by holding elements 8 and are arranged in such a way that there is one bimetallic plate 7 with a sacrificial anode 9 on each side of the brake disc 2. The bimetallic plates 7 are in a second position. That is to say that they have changed geometrically in such a way that the sacrificial anodes 9 are not in contact with the brake disc 2. In the illustration according to FIG. 7, the temperature of the sacrificial anode material 9 is higher than the melting temperature of the sacrificial anode material 9. A distance 10 has formed between the sacrificial anode 9 and the brake disc 2, preventing melting of the sacrificial anode 9.

LIST OF REFERENCE SIGNS

1 Disc brake assembly
2 Brake disc
3 Brake caliper support
4 Brake caliper
5 Friction brake pad
6 Backing plate of the friction brake pad
7 Bimetallic plate
8 Holding element
9 Sacrificial anode
10 Distance between the sacrificial anode and the brake disc
11 Fixed end
12 Free end
A Axis of rotation of the brake disc
$r_i$ Inner edge
$r_a$ Outer edge

The invention claimed is:
1. A disc brake assembly for a wheel of a transportation vehicle, the disc brake comprising:
   a brake disc; and
   a brake caliper support for holding a brake caliper with friction brake pads,
   wherein a bimetallic plate is provided on the disc brake assembly,
   wherein a sacrificial anode is secured on the bimetallic plate, wherein the bimetallic plate adopts at least two positions, depending on a temperature of the bimetallic plate, wherein the sacrificial anode rests at least partially against the brake disc in the first position and the sacrificial anode is at a distance from the brake disc in the second position, and wherein a fixed end of the bimetallic plate is fixed on the brake caliper support.

2. The disc brake assembly of claim 1, wherein the bimetallic plate is fixed to the assembly at a fixed end on a backing plate of the friction brake pad.

3. The disc brake assembly of claim 1, wherein the bimetallic plate is fixed to the assembly by riveting, welding or screw fastening.

4. The disc brake assembly of claim 1, wherein the sacrificial anode is secured on the bimetallic plate by adhesive bonding, clipping, welding or brazing.

5. The disc brake assembly of claim 1, wherein the sacrificial anode is secured on a free end of the bimetallic plate.

6. The disc brake assembly of claim 1, wherein the temperature of the sacrificial anode in the first position is lower than the melting temperature of the sacrificial anode.

7. The disc brake assembly of claim 1, wherein the contact area of the sacrificial anode on the brake disc extends over the entirety of a radial extent of the brake disc.

8. The disc brake assembly of claim 1, wherein the bimetallic plate and/or the sacrificial anode are/is curved around the axis of rotation of the brake disc.

9. The disc brake assembly of claim 1, wherein additional bimetallic plates with sacrificial anodes are provided.

10. The disc brake assembly of claim 1, wherein the bimetallic plate is curved around the axis of rotation of the brake disc so as to be concentric with the brake disc.

11. The disc brake assembly of claim 1, wherein the bimetallic plate extends away from the fixed end of the bimetallic plate and away from the friction brake pads in a circumferential direction.

12. The disc brake assembly of claim 1, wherein, in the first position, particles from the sacrificial anode are distributed onto the brake disc via mechanical abrasion so as to reduce brake disc corrosion.

13. The disc brake assembly of claim 1, wherein the sacrificial anode is comprised of at least one of zinc, sodium, and magnesium.

14. A disc brake assembly for a wheel of a transportation vehicle, the disc brake comprising:
a brake disc; and
a brake caliper support for holding a brake caliper with friction brake pads,
wherein at least one bimetallic plate is provided on the disc brake assembly,
wherein a sacrificial anode is secured on the at least one bimetallic plate,
wherein the at least one bimetallic plate adopts at least two positions, depending on a temperature of the at least one bimetallic plate,
wherein the sacrificial anode rests at least partially against the brake disc in the first position and the sacrificial anode is at a distance from the brake disc in the second position, wherein, in the first position, particles from the sacrificial anode are distributed onto the brake disc via mechanical abrasion so as to reduce brake disc corrosion, and
wherein a fixed end of the at least one bimetallic plate is fixed on the brake caliper support and prevented from moving axially with respect to the brake disc, and a free end of the at least one bimetallic plate located on an end of the at least one bimetallic plate opposite the fixed end is free to move axially with respect to the brake disc.

15. The disc brake assembly of claim 14, wherein the temperature of the sacrificial anode in the first position is lower than the melting temperature of the sacrificial anode.

16. The disc brake assembly of claim 14, wherein the contact area of the sacrificial anode on the brake disc extends over the entirety of a radial extent of the brake disc.

17. The disc brake assembly of claim 14, wherein:
the at least one bimetallic plate includes a first bimetallic plate and a second bimetallic plate;
the first bimetallic plate extends away from the friction brake pads in a clockwise circumferential direction; and
the second bimetallic plate extends away from the friction brake pads in a counterclockwise circumferential direction.

18. The disc brake assembly of claim 6,
wherein the temperature of the sacrificial anode in the second position is equal to or greater than the melting temperature of the sacrificial anode.

* * * * *